United States Patent
Shih et al.

(10) Patent No.: US 10,492,052 B2
(45) Date of Patent: Nov. 26, 2019

(54) DISASTER EMERGENCY RESCUE SYSTEM AND COMMUNICATION METHOD THEREOF

(71) Applicant: TAMKANG UNIVERSITY, New Taipei (TW)

(72) Inventors: Kuei-Ping Shih, New Taipei (TW); Pei-Ning Weng, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 0 days.

(21) Appl. No.: 16/151,389

(22) Filed: Oct. 4, 2018

(65) Prior Publication Data

US 2019/0246259 A1  Aug. 8, 2019

(30) Foreign Application Priority Data

Feb. 7, 2018 (TW) .............................. 107104235 A (51) Int. Cl.
| | |
|---|---|
| H04M 11/04 | (2006.01) |
| H04W 4/90 | (2018.01) |
| H04B 17/26 | (2015.01) |
| H04B 17/364 | (2015.01) |
| H04B 17/318 | (2015.01) |
| H04W 4/02 | (2018.01) |

(52) U.S. Cl.
CPC .............. *H04W 4/90* (2018.02); *H04B 17/26* (2015.01); *H04B 17/318* (2015.01); *H04B 17/364* (2015.01); *H04W 4/023* (2013.01)

(58) Field of Classification Search
CPC ....... H04W 76/007; H04W 4/22; H04W 4/02; H04W 64/00

USPC ..................... 455/404.1, 404.2, 456.1, 456.2
See application file for complete search history.

(56) References Cited

U.S. PATENT DOCUMENTS

| | | | | |
|---|---|---|---|---|
| 6,958,707 | B1 * | 10/2005 | Siegel ................... | G08G 1/087 340/435 |
| 7,349,706 | B2 * | 3/2008 | Kim ....................... | H04W 4/90 455/456.1 |
| 2006/0015254 | A1 * | 1/2006 | Smith ..................... | H04W 4/02 702/3 |
| 2010/0214118 | A1 * | 8/2010 | Losee ................... | G01S 5/0027 340/8.1 |
| 2014/0011471 | A1 * | 1/2014 | Khosla ................... | H04W 4/02 455/404.2 |
| 2015/0050906 | A1 * | 2/2015 | Yuasa .................... | H04W 4/02 455/404.2 |
| 2015/0061895 | A1 * | 3/2015 | Ricci ....................... | G06F 16/25 340/902 |
| 2017/0325056 | A1 * | 11/2017 | Mehta ..................... | H04W 4/90 |
| 2019/0037340 | A1 * | 1/2019 | Howard ............. | G08B 13/1427 |

* cited by examiner

*Primary Examiner* — Temica M Beamer
(74) *Attorney, Agent, or Firm* — WPAT, PC (57) ABSTRACT

A disaster emergency rescue system is provided, which may include a first mobile device and a second mobile device. The first mobile device executes a first application to broadcast a positioning signal based on a first communication protocol. The second mobile device receives the positioning signal to activate a second application, originally in suspended status or not-running status, installed on the second mobile device. After the second application is activated, the first application of the first mobile device communicates with the second application of the second mobile device.

6 Claims, 6 Drawing Sheets

DISASTER EMERGENCY RESCUE SYSTEM AND COMMUNICATION METHOD THEREOF

CROSS REFERENCE TO RELATED APPLICATION

This application also claims priority to Taiwan Patent Application No. 107104235 filed in the Taiwan Patent Office on Feb. 7, 2018, the entire content of which is incorporated herein by reference.

TECHNICAL FIELD

The present disclosure relates to a disaster emergency rescue system, in particular to a disaster emergency rescue system using mobile devices. The present disclosure further relates to the communication method of the system.

BACKGROUND

Currently, the functions of electronic devices keep being improved due to advances in technology. The most popular electronic device is smart phone, which has become an indispensable tool of everyone. When a disaster occurs, the user of a smart phone can communicate with other people via a mobile communication network or Wi-Fi in order to ask for rescue or recue other people.

However, the mobile communication network may be not applicable to some serious disasters, such as earthquake, tsunami, war, etc. For instance, if a rescuee is, when an earthquake occurs, at a location with bad reception or the base stations have been damaged due to the earthquake, the mobile communication network may not work normally. Thus, the rescuee cannot communicate with other people via the smart phone.

Besides, as most of smart phones turn off the Wi-Fi modules in sleep status in order to reduce the power consumption, the Wi-Fi modules cannot be always in running status. Therefore, when a disaster happens, the rescuee may not communicate with other people via Wi-Fi.

Moreover, the rescuee may be unconscious when a disaster occurs, so cannot operate his/her smart phone. Thus, the rescuers cannot communicate with the rescuee.

Accordingly, many disaster emergency rescue systems are developed so as to solve the above problems. However, these currently available disaster emergency rescue systems will keep consuming the system resources of smart phones after being activated, which may influence the performance of the smart phones.

Further, these currently available disaster emergency rescue systems may not function in suspended status or not-running status. Therefore, when a rescuee cannot operate his/her smart phone because being unconscious, these currently available disaster emergency rescue systems cannot help the rescuers rescue the rescuee. Thus, these currently available disaster emergency rescue systems are not practical in use.

Therefore, it has become an important issue to provide a disaster emergency rescue system so as to solve the above problems.

SUMMARY

The present disclosure is related to a disaster emergency rescue system. In one embodiment of the disclosure, the disaster emergency rescue system may include a first mobile device and a second mobile device. The first mobile device may execute a first application to broadcast a positioning signal based on a first communication protocol. The second mobile device may receive the positioning signal to activate a second application, originally in suspended status or not-running status, installed on the second mobile device. After the second application is activated, the first application of the first mobile device may communicate with the second application of the second mobile device.

In a preferred embodiment of the disclosure, the first mobile device may communicate with the second application of the second mobile device via the first application and a mobile communication network.

In a preferred embodiment of the disclosure, the first mobile device may periodically and alternately broadcast the positioning signal and a communication service signal.

In a preferred embodiment of the disclosure, when the second application is activated, the second mobile device may enable a communication service function based on a second communication protocol and the second mobile device may return a communication response signal to the first mobile device after receiving the communication service signal so as to establish a communication connection between the second mobile device and the first mobile device.

In a preferred embodiment of the disclosure, after the communication connection is established, the first mobile device may calculate the distance between the second mobile device and the first mobile device according to the strength of the returned signal of the second mobile device and display the distance.

In a preferred embodiment of the disclosure, after the second application is activated, the second mobile device may transmit user data to the first mobile and the first mobile device may display the user data via the first application.

In a preferred embodiment of the disclosure, the user data may include healthy data.

In a preferred embodiment of the disclosure, the user data may further include one or more of personal data, operational record data and action record data.

In a preferred embodiment of the disclosure, the operational record data may include the historical operational data of a user operating the second mobile device during a time period.

In a preferred embodiment of the disclosure, the action record data may include the historical action data of a user carrying the second mobile device during a time period.

The present disclosure is related to a disaster emergency rescue communication method. In one embodiment of the disclosure, the disaster emergency rescue communication method may include the following steps: executing a first application by a first mobile device to broadcast a positioning signal based on a first communication protocol; receiving the positioning signal by a second mobile device to activate a second application, originally in suspended status or not-running status, installed on the second mobile device; and the first mobile device communicating with the second application of the second mobile device via the first application after the second application is activated.

In a preferred embodiment of the disclosure, the first mobile device may communicate with the second application of the second mobile device via the first application and a mobile communication network.

In a preferred embodiment of the disclosure, the step of executing the first application by the first mobile device to broadcast the positioning signal based on the first communication protocol may further include the following step:

broadcasting a communication service signal, and periodically and alternately broadcasting the positioning signal and the communication service signal by the first mobile device.

In a preferred embodiment of the disclosure, the step of the first mobile device communicating with the second application of the second mobile device via the first application after the second application is activated may further include the following steps: enabling a communication service function based on a second communication protocol by the second mobile device; and returning a communication response signal to the first mobile device by the second mobile device after receiving the communication service signal so as to establish a communication connection between the second mobile device and the first mobile device.

In a preferred embodiment of the disclosure, the step of returning the communication response signal to the first mobile device by the second mobile device after receiving the communication service signal so as to establish the communication connection between the second mobile device and the first mobile device may further include the following step: calculating the distance between the second mobile device and the first mobile device according to the strength of the returned signal of the second mobile device by the first mobile device and displaying the distance by the first application.

In a preferred embodiment of the disclosure, the step of the first mobile device communicating with the second application of the second mobile device via the first application after the second application is activated may further the following step: transmitting user data to the first mobile by the second mobile device and displaying the user data via the first application by the first mobile device.

In a preferred embodiment of the disclosure, the user data may include healthy data.

In a preferred embodiment of the disclosure, the user data may further include one or more of personal data, operational record data and action record data.

In a preferred embodiment of the disclosure, the operational record data may include the historical operational data of a user operating the second mobile device during a time period.

In a preferred embodiment of the disclosure, the action record data may include the historical action data of a user carrying the second mobile device during a time period.

According to the embodiments of the present disclosures, the disaster emergency rescue system and the communication method thereof may have the following advantages:

(1) In one embodiment of the present disclosure, the second mobile device can enable the communication service function based on the second communication protocol after receiving the positioning signal so as to establish a communication connection between the second mobile device and the first mobile device. Thus, when the rescuee cannot use the second mobile device to communicate with other people via the mobile communication network, the rescuee can still use the second mobile device to communicate with the first mobile device via the communication connection.

(2) In one embodiment of the present disclosure, the second mobile device can enable the communication service function based on the second communication protocol after receiving the positioning signal so as to establish the communication connection between the second mobile device and the first mobile device. Therefore, when the Wi-Fi module of the second mobile device is turned off, the rescuee can still use the second mobile device to communicate with the first mobile device via the communication connection.

(3) In one embodiment of the present disclosure, when the second application of the second mobile device is activated, the second mobile device can automatically transmit the user data to the first mobile device. Therefore, the disaster emergency rescue system can provide useful information for the rescuers even though the rescuee cannot operate his/her smart phone because being unconscious.

(4) In one embodiment of the present disclosure, the second application of the second mobile device can be in suspended status or not-running status for a long time, and can be waked up only after receiving the positioning signal; thus, the system will not waste the system resources of the second mobile device.

(5) In one embodiment of the present disclosure, the second application of the second mobile device can be waked up from suspended status or not-running status after receiving the positioning signal in order to execute various functions, so the system is more practical in use.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected"

to the other element through a third element. In contrast, it should be understood that, when it is described that an element is "directly coupled" or "directly connected" to another element, there are no intervening elements.

Figure 1:
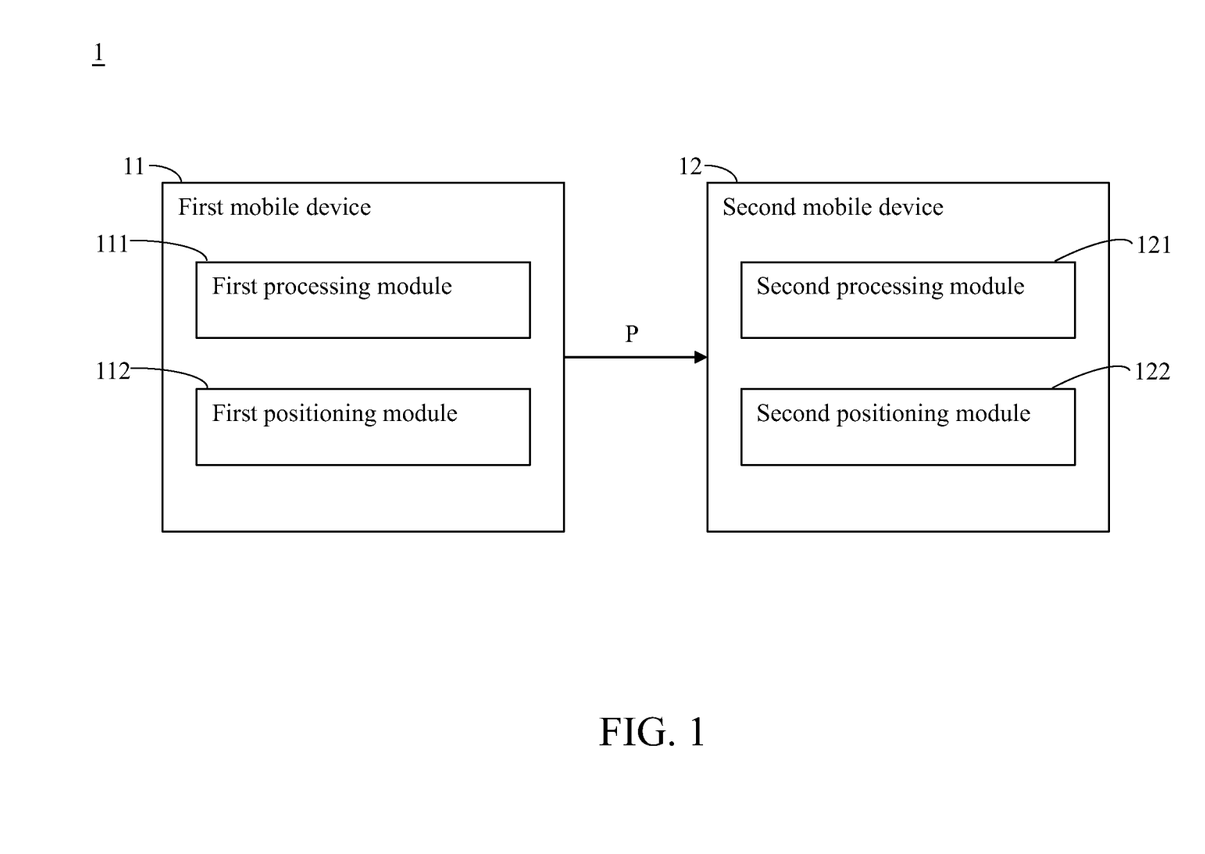
FIG. 1 is a block diagram of a disaster emergency rescue system in accordance with a first embodiment of the present disclosure.

Please refer to FIG. 1, which is a block diagram of a disaster emergency rescue system in accordance with a first embodiment of the present disclosure. As shown in FIG. 1, the disaster emergency rescue system 1 includes a first mobile device 11 and a second mobile device 12; the rescuer carries the first mobile device 11 and the rescuee carries the second mobile device 12.

The first mobile device 11 includes a first processing module 111 and a first positioning module 112. The first processing module 111 executes a first application (rescuer application) to broadcast a positioning signal P based on a first communication protocol via the first positioning module 112. In a preferred embodiment, the first communication protocol may be iBeacon communication protocol or other similar communication protocols.

The second mobile device 12 includes a second processing module 121 and a second positioning module 122. The second processing module 121 receives the positioning signal P via the second positioning module 122 to activate a second application (emergency application) installed on the second mobile device 12; the second application can be activated even though the second application is in suspended status or not-running status. Then, the second processing module 121 can execute the second application.

Afterward, the rescuer can use the first mobile device 11 to communicate with the second application of the second mobile device 12 carried by the rescuee via the first application and the mobile communication network.

As described above, when a disaster occurs, the rescuer can use the first mobile device 11 to execute the first application (rescuer application) to broadcast the positioning signal P based on the first communication protocol in order to search the rescuee. After searching out the rescuee, the rescuer can directly use the first mobile device 11 to communicate with the second mobile device 12 of the rescuee via the first application in order to increase the chance of successfully rescuing the rescuee.

In addition, the second application of the second mobile device 12 can be in suspended status or not-running status during a long time period, and can be waked up after the second mobile device 12 receives the positioning signal P, so the second application can be timely activated without wasting the system resources of the second mobile device 12.

The embodiment just exemplifies the present disclosure and is not intended to limit the scope of the present disclosure; any equivalent modification and variation according to the spirit of the present disclosure is to be also included within the scope of the following claims and their equivalents.

Figure 2:
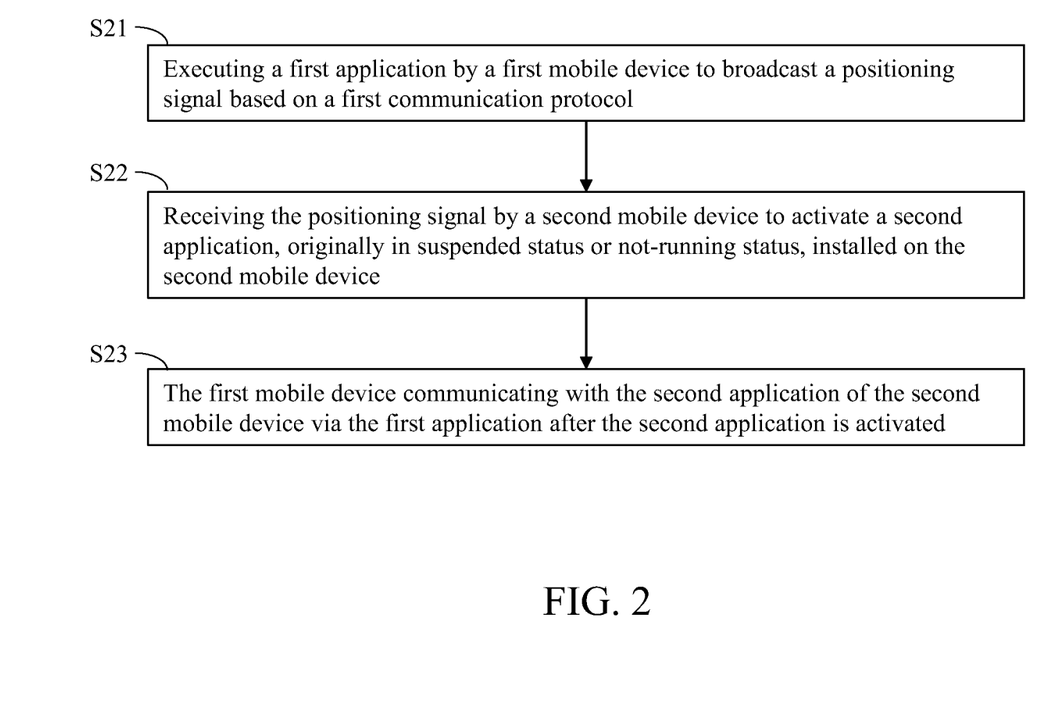
FIG. 2 is a flow chart of the first embodiment of the present disclosure.

Please refer to FIG. 2, which is a flow chart of the first embodiment of the present disclosure. As shown in FIG. 2, the communication method of the disaster emergency rescue system 1 of the embodiment includes the following steps:

Step S21: executing a first application by a first mobile device to broadcast a positioning signal based on a first communication protocol.

Step S22: receiving the positioning signal by a second mobile device to activate a second application, originally in suspended status or not-running status, installed on the second mobile device.

Step S23: the first mobile device communicating with the second application of the second mobile device via the first application after the second application is activated.

Figure 3:
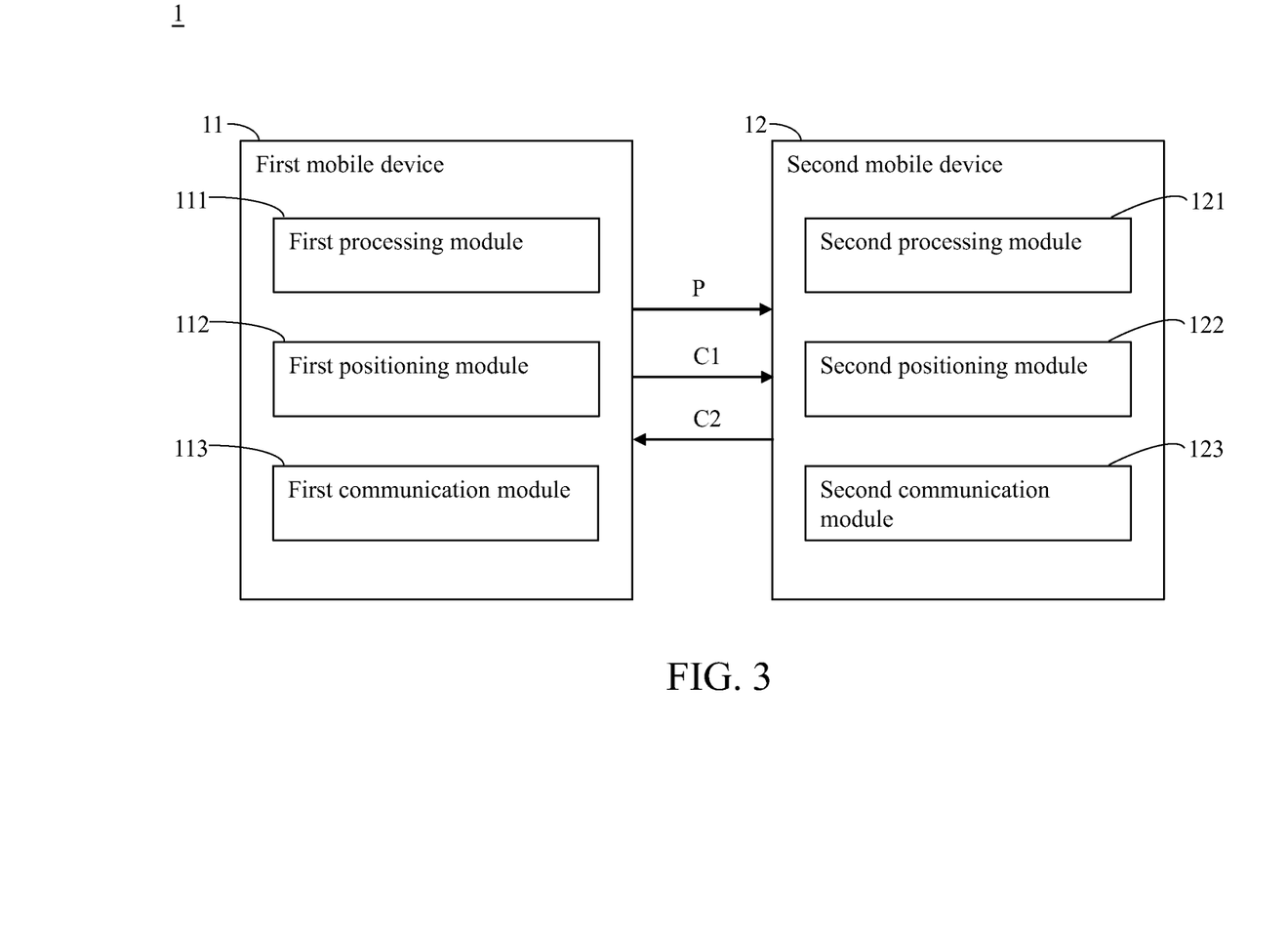
FIG. 3 is a block diagram of a disaster emergency rescue system in accordance with a second embodiment of the present disclosure.

Please refer to FIG. 3, which is a block diagram of a disaster emergency rescue system in accordance with a second embodiment of the present disclosure. As shown in FIG. 3, the disaster emergency rescue system 1 includes a first mobile device 11 and a second mobile device 12; the rescuer carries the first mobile device 11 and the rescuee carries the second mobile device 12.

The first mobile device 11 includes a first processing module 111, a first positioning module 112 and a first communication module 113. The first processing module 111 executes a first application (rescuer application) to periodically and alternately broadcast a positioning signal P based on a first communication protocol and a communication service signal C1 based on a communication service signal via the first positioning module 112 and the first communication module 113. In a preferred embodiment, the second communication protocol may be Bluetooth Low Energy (BLE) communication protocol or other similar communication protocols.

The second mobile device 12 includes a second processing module 121, a second positioning module 122 and a second communication module 123. The second processing module 121 receives the positioning signal P via the second positioning module 122 to activate a second application (emergency application) installed on the second mobile device 12; the second application can be activated even though the second application is in suspended status or not-running status. Then, the second processing module 121 can execute the second application.

Afterward, the second processing module 121 activates the second communication module 123 to enable the communication service function based on the second communication protocol after the second application is activated. After receiving the communication service signal C1, the second communication module 123 returns a communication response signal C2 to the first mobile device 11. In this way, a communication connection between the first mobile device 11 and the second mobile device 12 can be established, so the first mobile device 11 can communicate with the second mobile device 12 via the communication service function based on the second communication protocol.

Further, the first processing module 11 of the first mobile device 11 can calculate the distance between the second mobile device 12 and the first mobile device 11 according to the strength of the returned signals of the second mobile device 12, and display the distance via the first application. Accordingly, the rescuer can know the approximate location of the rescuee in order to increase the chance of successfully rescuing the rescuee.

As described above, in the embodiment, the first mobile device 11 can periodically and alternately broadcast the positioning signal P based on the first communication protocol and the communication service signal C1 based on the second communication protocol. Therefore, the rescuer can search the second mobile device 12 of the rescuee via the positioning signal P and then enable the corresponding communication service function of the second mobile device 12 via the communication service signal C1 after searching out the second mobile device 12 so as to establish the communication connection between the first mobile device 11 and the second mobile device 12. Therefore, if the rescuee cannot use the second mobile device 12 to communicate with the first mobile device 11 of the rescuer via the mobile communication network, the rescue can use the communication connection based on the second communication protocol to communicate with the first mobile device 11 of the rescuer.

Besides, the second mobile device 12 can simultaneously enable the communication service function based on the second communication protocol when receiving the positioning signal P. Accordingly, the second mobile device 12 can communicate with the first mobile device 11 via the communication connection based on the second communication protocol even though the Wi-Fi module of the second mobile device 12 cannot be activated and the above communication service function is still in suspended status or not-running status.

The embodiment just exemplifies the present disclosure and is not intended to limit the scope of the present disclosure; any equivalent modification and variation according to the spirit of the present disclosure is to be also included within the scope of the following claims and their equivalents.

It is worthy to point out that if a rescuee is at a location with bad reception or the base stations have been damaged when a disaster occurs, the mobile communication network may not work normally; thus, the rescuee cannot communicate with other people via the smart phone. On the contrary, according to one embodiment of the present disclosure, the second mobile device can enable the communication service function based on the second communication protocol after receiving the positioning signal so as to establish a communication connection between the second mobile device and the first mobile device. Thus, when the rescuee cannot use the second mobile device to communicate with other people via the mobile communication network, the rescuee can still use the second mobile device to communicate with the first mobile device via the communication connection.

Besides, as most of smart phones turn off the Wi-Fi modules in sleep status in order to reduce the power consumption, the Wi-Fi modules cannot be always in running status. Therefore, when a disaster happens, the rescuee may not communicate with other people via Wi-Fi. On the contrary, according to one embodiment of the present disclosure, the second mobile device can enable the communication service function based on the second communication protocol after receiving the positioning signal so as to establish the communication connection between the second mobile device and the first mobile device. Therefore, when the Wi-Fi module of the second mobile device is turned off, the rescuee can still use the second mobile device to communicate with the first mobile device via the communication connection.

Moreover, the currently available disaster emergency rescue systems will keep consuming the system resources of smart phones after being activated, which may influence the performance of the smart phones. On the contrary, according to one embodiment of the present disclosure, the second application of the second mobile device can be in suspended status or not-running status for a long time, and can be waked up only after receiving the positioning signal; thus, the system will not waste the system resources of the second mobile device.

Furthermore, the currently available disaster emergency rescue systems may not function in suspended status or not-running status. Therefore, when a rescuee cannot operate his/her smart phone because being unconscious, these currently available disaster emergency rescue systems cannot help the rescuers rescue the rescuee. Thus, these currently available disaster emergency rescue systems are not practical in use. On the contrary, according to one embodiment of the present disclosure, the second application of the second mobile device can be waked up from suspended status or not-running status after receiving the positioning signal in order to execute various functions, so the system is more practical in use.

Figure 4:
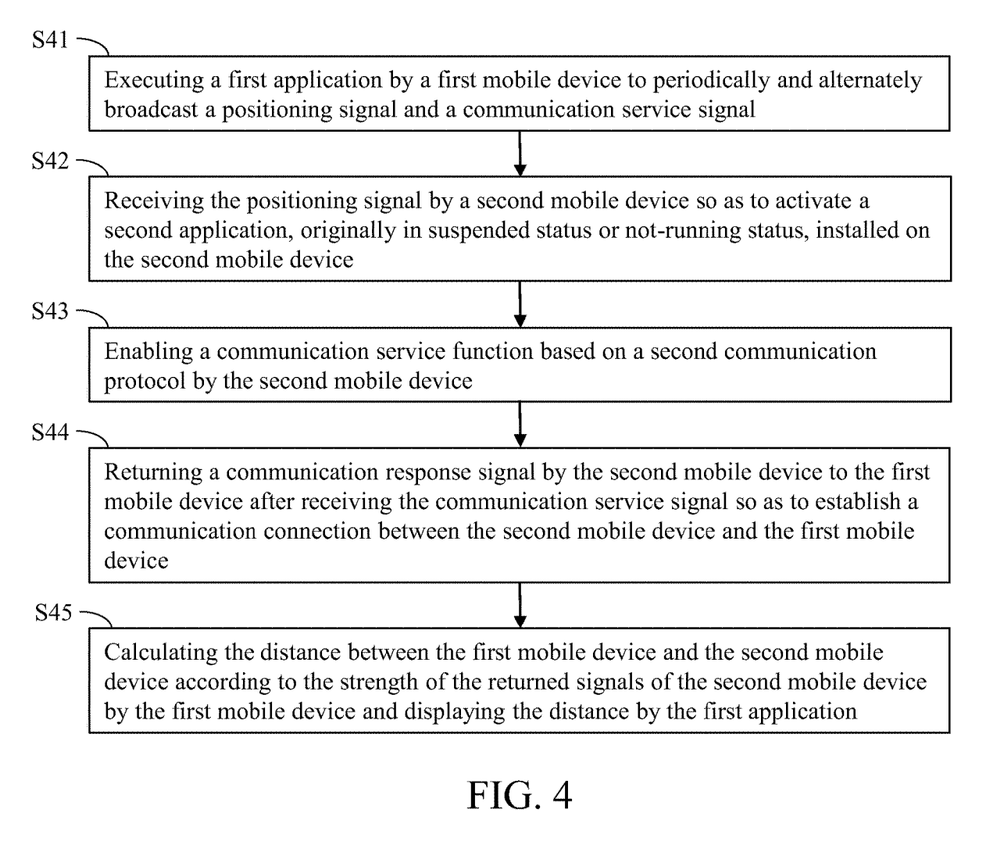
FIG. 4 is a flow chart of the second embodiment of the present disclosure.

Please refer to FIG. 4, which is a flow chart of the second embodiment of the present disclosure. As shown in FIG. 4, the communication method of the disaster emergency rescue system 1 of the embodiment includes the following steps:

Step S41: executing a first application by a first mobile device to periodically and alternately broadcast a positioning signal and a communication service signal.

Step S42: receiving the positioning signal by a second mobile device so as to activate a second application, originally in suspended status or not-running status, installed on the second mobile device.

Step S43: enabling a communication service function based on a second communication protocol by the second mobile device.

Step S44: returning a communication response signal by the second mobile device to the first mobile device after receiving the communication service signal so as to establish a communication connection between the second mobile device and the first mobile device.

Step S45: calculating the distance between the first mobile device and the second mobile device according to the strength of the returned signals of the second mobile device by the first mobile device and displaying the distance by the first application.

Figure 5:
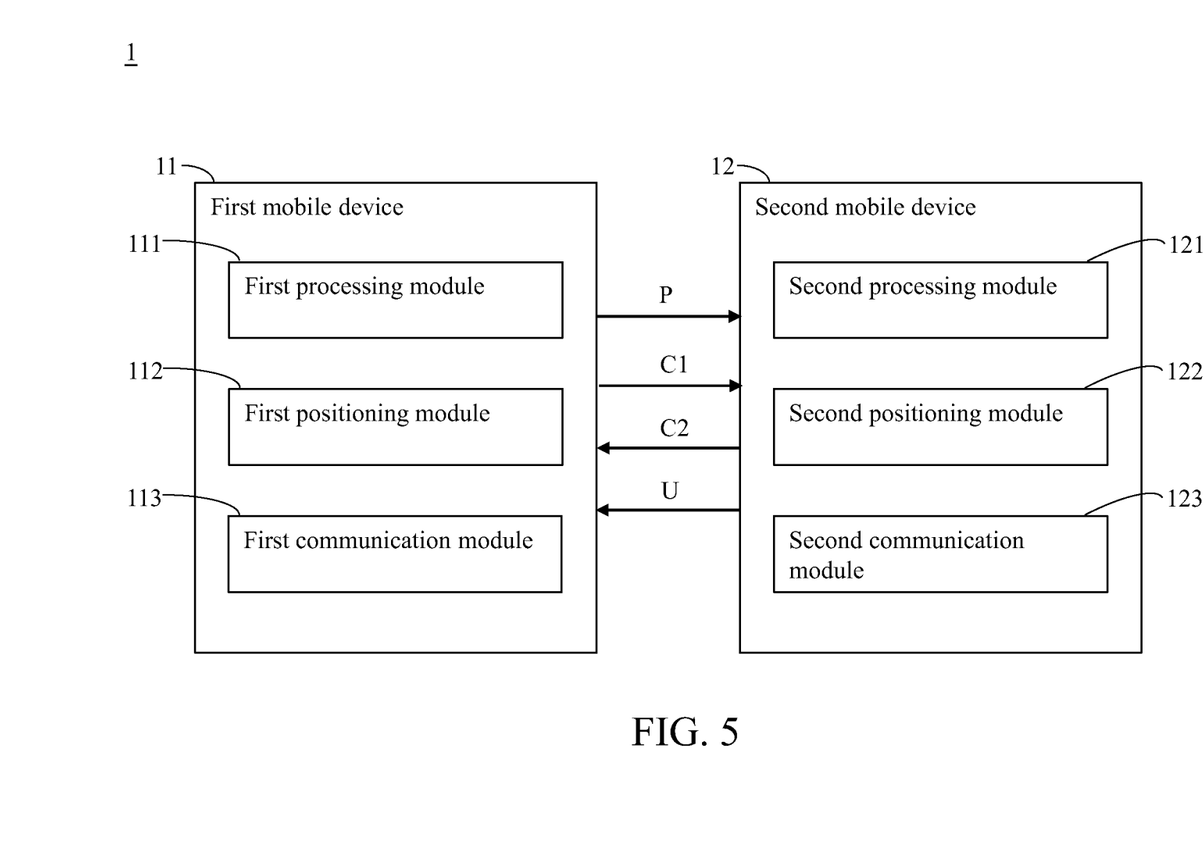
FIG. 5 is a block diagram of a disaster emergency rescue system in accordance with a third embodiment of the present disclosure.

Please refer to FIG. 5, which is a block diagram of a disaster emergency rescue system in accordance with a third embodiment of the present disclosure. As shown in FIG. 5, the disaster emergency rescue system 1 includes a first mobile device 11 and a second mobile device 12; the rescuer carries the first mobile device 11 and the rescuee carries the second mobile device 12.

The first mobile device 11 includes a first processing module 111, a first positioning module 112 and a first communication module 113. The first processing module 111 executes a first application (rescuer application) to periodically and alternately broadcast a positioning signal P based on a first communication protocol and a communication service signal C1 based on a communication service signal via the first positioning module 112 and the first communication module 113.

The second mobile device 12 includes a second processing module 121, a second positioning module 122 and a second communication module 123. The second processing module 121 receives the positioning signal P via the second positioning module 122 to activate a second application (emergency application) installed on the second mobile device 12; the second application can be activated even though the second application is in suspended status or not-running status. Then, the second processing module 121 can execute the second application.

Similarly, the second processing module 121 activates the second communication module 123 to enable the communication service function based on the second communication protocol after the second application is activated. After receiving the communication service signal C1, the second communication module 123 returns a communication response signal C2 to the first mobile device 11 so as to establish a communication connection between the first mobile device 11 and the second mobile device 12 for the first mobile device 11 and the second mobile device 12 to communicate with each other.

The functions of the above elements and the cooperation relations between these elements are similar to those of the previous embodiment, so will not be described again herein. The difference between the embodiment and the previous embodiment is that the second processing module 121 of the second mobile device 12, in the embodiment, further transmits user data U saved in the memory of the second mobile device 12 to the first mobile device 11 via the above communication connection, and the first mobile device 11 displays the user data U via the first application.

More specifically, the user data U may include the healthy data, so the rescuer can understand the healthy status of the rescuee. in a preferred embodiment, the healthy data may include the heartbeat data.

Besides, the user data U may further include personal data, so the rescuer can understand the identity and other relevant information of the rescuee. In a preferred embodiment, the personal data may include blood type, age, name, emergency contact person, etc.

Moreover, the user data U may further include operational record data, so the rescuer can understand whether the rescuee uses the second mobile device 12 after the disaster occurs and other relevant information. In a preferred embodiment, the operational record data may include the historical operational data of the rescuer operating the second mobile device during a time period.

Furthermore, the user data U may further include action record data, so the rescuer can understand whether the rescuee moves the second mobile device 12 after the disaster occurs and other relevant information. In a preferred embodiment, the action record data may include the historical action data of the rescuee carrying the second mobile device during a time period, which may include standstill, running, walking, operating the second mobile device 12, talking on the second mobile device 12, etc.

As described above, the second mobile device 12 can automatically transmit the user data U to the first mobile device 11 after the second application is activated. Therefore, the disaster emergency rescue system 1 can still provide a lot of useful information for the rescuer even though the rescuee is unconscious and cannot operate the second mobile device 12, which can increase the chance of successfully rescuing the rescuee.

The embodiment just exemplifies the present disclosure and is not intended to limit the scope of the present disclosure; any equivalent modification and variation according to the spirit of the present disclosure is to be also included within the scope of the following claims and their equivalents.

It is worthy to point out that the rescuee may be unconscious when a disaster occurs, so cannot operate his/her smart phone. Thus, the rescuers cannot communicate with the rescuee. On the contrary, according to one embodiment of the present disclosure, when the second application of the second mobile device is activated, the second mobile device can automatically transmit the user data to the first mobile device. Therefore, the disaster emergency rescue system can provide useful information for the rescuers even though the rescuee cannot operate his/her smart phone because being unconscious.

Figure 6:
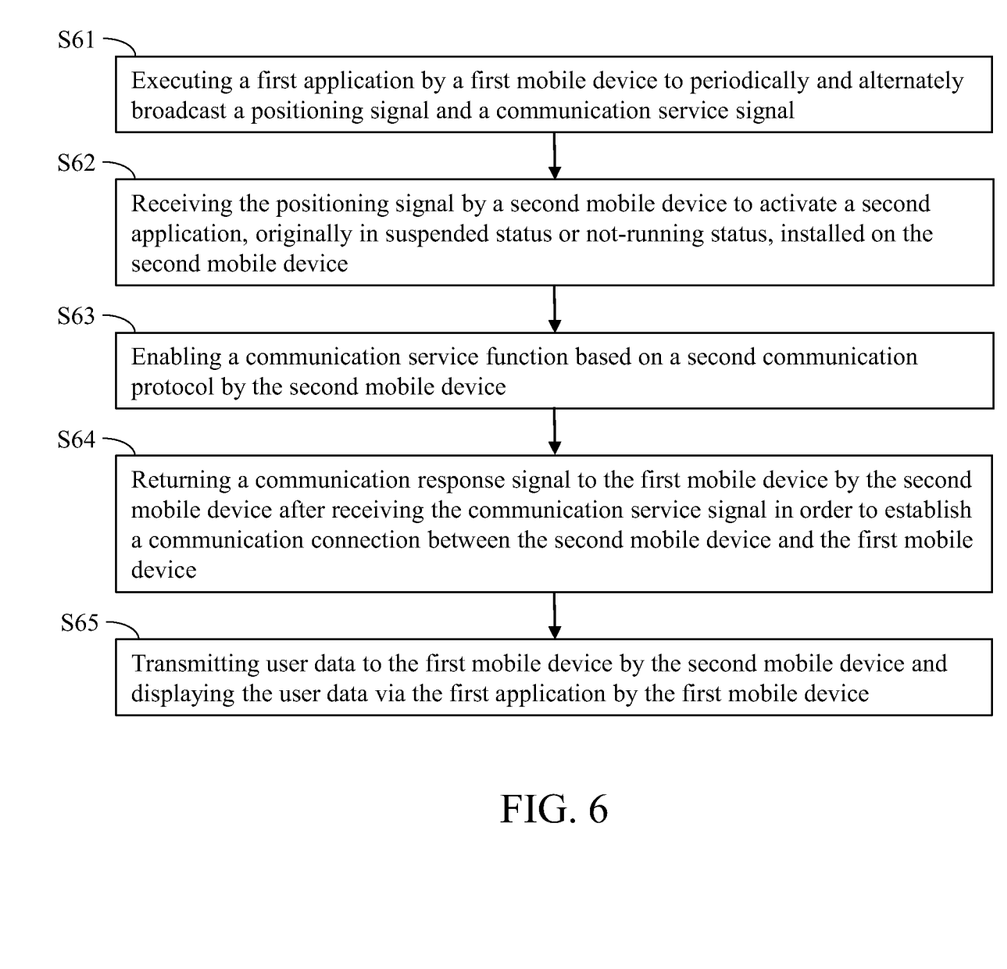
FIG. 6 is a flow chart of the third embodiment of the present disclosure.

Please refer to FIG. 6, which is a flow chart of the third embodiment of the present disclosure. As shown in FIG. 6, the communication method of the disaster emergency rescue system 1 of the embodiment includes the following steps:

Step S61: executing a first application by a first mobile device to periodically and alternately broadcast a positioning signal and a communication service signal.

Step S62: receiving the positioning signal by a second mobile device to activate a second application, originally in suspended status or not-running status, installed on the second mobile device.

Step S63: enabling a communication service function based on a second communication protocol by the second mobile device.

Step S64: returning a communication response signal to the first mobile device by the second mobile device after receiving the communication service signal in order to establish a communication connection between the second mobile device and the first mobile device.

Step S65: transmitting user data to the first mobile device by the second mobile device and displaying the user data via the first application by the first mobile device.

To sum up, according to one embodiment of the present disclosure, the second mobile device can enable the communication service function based on the second communication protocol after receiving the positioning signal so as to establish a communication connection between the second mobile device and the first mobile device. Thus, when the rescuee cannot use the second mobile device to communicate with other people via the mobile communication network, the rescuee can still use the second mobile device to communicate with the first mobile device via the communication connection.

(2) According to one embodiment of the present disclosure, the second mobile device can enable the communication service function based on the second communication protocol after receiving the positioning signal so as to establish the communication connection between the second mobile device and the first mobile device. Therefore, when the Wi-Fi module of the second mobile device is turned off, the rescuee can still use the second mobile device to communicate with the first mobile device via the communication connection.

(3) According to one embodiment of the present disclosure, when the second application of the second mobile device is activated, the second mobile device can automatically transmit the user data to the first mobile device. Therefore, the disaster emergency rescue system can provide useful information for the rescuers even though the rescuee cannot operate his/her smart phone because being unconscious.

(4) According to one embodiment of the present disclosure, the second application of the second mobile device can be in suspended status or not-running status for a long time, and can be waked up only after receiving the positioning signal; thus, the system will not waste the system resources of the second mobile device.

(5) According to one embodiment of the present disclosure, the second application of the second mobile device can be waked up from suspended status or not-running status after receiving the positioning signal in order to execute various functions, so the system is more practical in use.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A disaster emergency rescue system, comprising:
a first mobile device, configured to execute a first application to broadcast a positioning signal based on a first communication protocol; and a second mobile device, configured to receive the positioning signal, wherein a second application is installed on the second mobile device and the second application is originally in a suspended status or a not-running status; the second application is activated after the second mobile device receives the positioning signal and the second mobile device simultaneously transmits a user data to the first mobile device comprising a healthy data, a personal data, an operational record data and an action record data; the operational record data comprises a historical operational data of a user operating the second mobile device during a time period; the action record data comprises a historical action data of the user carrying the second mobile device during the time period, and the historical action data comprises action records of standstill, running, walking, operating the second mobile device and talking on the second mobile device of the user;

wherein after the second application is activated, the first mobile device receives the user data, and periodically and alternately broadcasts the positioning signal and a communication service signal; the second mobile device enables a communication service function based on a second communication protocol and the second mobile device returns a communication response signal to the first mobile device after receiving the communication service signal so as to establish a communication connection between the second mobile device and the first mobile device, whereby the first application of the first mobile device communicates with the second application of the second mobile device.

2. The disaster emergency rescue system of claim 1, wherein the first mobile device communicates with the second application of the second mobile device via the first application and a mobile communication network.

3. The disaster emergency rescue system of claim 1, wherein after the communication connection is established, the first mobile device calculates a distance between the second mobile device and the first mobile device according to a strength of a returned signal of the second mobile device and displays the distance.

4. A disaster emergency rescue communication method, comprising:

executing a first application by a first mobile device to broadcast a positioning signal based on a first communication protocol;

receiving the positioning signal by a second mobile device, wherein a second application is installed on the second mobile device and the second application is originally in a suspended status or a not-running status;

activating the second application by the second mobile device after the second mobile device receiving the positioning signal and simultaneously transmitting a user data to the first mobile device, comprising a healthy data, a personal data, an operational record data and an action record data, by the second mobile device, wherein the operational record data comprises a historical operational data of a user operating the second mobile device during a time period; the action record data comprises a historical action data of the user carrying the second mobile device during the time period; the historical action data comprises action records of standstill, running, walking, operating the second mobile device and talking on the second mobile device of the user;

receiving the user data, and periodically and alternately broadcasting the positioning signal and a communication service signal by the first mobile device;

enabling a communication service function based on a second communication protocol and returning a communication response signal to the first mobile device by the second mobile device after receiving the communication service signal so as to establish a communication connection between the second mobile device and the first mobile device, whereby the first application of the first mobile device communicates with the second application of the second mobile device after the second application is activated.

5. The method of claim 4, wherein the first mobile device communicates with the second application of the second mobile device via the first application and a mobile communication network.

6. The method of claim 4, wherein a step of returning the communication response signal to the first mobile device by the second mobile device after receiving the communication service signal so as to establish the communication connection between the second mobile device and the first mobile device further comprises:

calculating a distance between the second mobile device and the first mobile device according to a strength of a returned signal of the second mobile device by the first mobile device and displaying the distance by the first application.

* * * * *